(12) United States Patent
Nagata et al.

(10) Patent No.: US 12,236,787 B2
(45) Date of Patent: Feb. 25, 2025

(54) INFORMATION PROCESSING APPARATUS, INFORMATION PROCESSING METHOD, AND NON-TRANSITORY COMPUTER READABLE MEDIUM

(71) Applicant: TOYOTA JIDOSHA KABUSHIKI KAISHA, Toyota Aichi-ken (JP)

(72) Inventors: Yu Nagata, Chofu Tokyo-to (JP); Tomoyuki Kozuka, Toyota Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/385,016

(22) Filed: Oct. 30, 2023

(65) Prior Publication Data

US 2024/0144808 A1  May 2, 2024

(30) Foreign Application Priority Data

Nov. 1, 2022  (JP) ................................. 2022-175760

(51) Int. Cl.
*G08B 1/00* (2006.01)
*G08B 25/00* (2006.01)
*G08G 1/00* (2006.01)
*G08G 1/16* (2006.01)

(52) U.S. Cl.
CPC ............ *G08G 1/161* (2013.01); *G08B 25/00* (2013.01); *G08G 1/00* (2013.01)

(58) Field of Classification Search
CPC .......... G08B 25/00; G08G 1/00; G08G 1/087; G08G 1/09; G08G 1/127; G08G 1/161; G01S 13/88; G01S 13/89; B60K 25/00; B60K 35/85
See application file for complete search history.

(56) References Cited

U.S. PATENT DOCUMENTS

| 11,466,997 | B1* | 10/2022 | Williams | H04W 4/024 |
| 2002/0126022 | A1* | 9/2002 | Ellis | G01S 13/89 340/904 |
| 2014/0278029 | A1* | 9/2014 | Tonguz | G08G 1/161 701/117 |
| 2022/0119005 | A1* | 4/2022 | Gerrese | G05D 1/0055 |

FOREIGN PATENT DOCUMENTS

JP  2016-106321 A  6/2016

* cited by examiner

*Primary Examiner* — Van T Trieu
(74) *Attorney, Agent, or Firm* — Dinsmore & Shohl LLP (57) ABSTRACT

An information processing apparatus capable of communicating with a plurality of vehicles configured to perform automated driving includes a controller configured to execute operations, the operations including receiving, from each of the plurality of vehicles, a notification of a content of an abnormality, in-vehicle images, and the number of persons in the vehicle, prioritizing the plurality of vehicles based on determination results by determining, for each of the plurality of vehicles, a load of an automated driving process and the number of persons in the vehicle, and displaying with emphasis the content of the abnormality of a vehicle of a highest priority and the in-vehicle images of the vehicle of the highest priority.

20 Claims, 6 Drawing Sheets

| VEHICLE | CONTENT OF ABNORMALITY | SCREEN NUMBER | NUMBER OF PERSONS IN VEHICLE | LATITUDE AND LONGITUDE | AUTOMATED DRIVING LEVEL | ADK LOAD | ADK PROVIDER |
|---|---|---|---|---|---|---|---|
| 2E | DANGEROUS ACT WHILE DRIVING | 2e | 12 | XXX | L4 | HEAVY | A CORPORATION |
| 2F | DANGEROUS ACT WHILE DRIVING | 2f | 6 | YYY | L4 | MEDIUM | B CORPORATION |
| ... | ... | ... | ... | ... | ... | ... | ... |

FIG. 6

INFORMATION PROCESSING APPARATUS, INFORMATION PROCESSING METHOD, AND NON-TRANSITORY COMPUTER READABLE MEDIUM

CROSS-REFERENCE TO RELATED APPLICATION

This application claims priority to Japanese Patent Application No. 2022-175760, filed on Nov. 1, 2022, the entire contents of which are incorporated herein by reference.

TECHNICAL FIELD

The present disclosure relates to an information processing apparatus, an information processing method, and a program.

BACKGROUND

Technology in which one of multiple images is displayed in a main screen area and another image is displayed in a secondary screen area, and when a slide operation in a first direction in the main screen area is detected, the secondary screen area is blanked and the main screen area is displayed, as one screen, in a display area including the blanked area is known. For example, see Patent Literature (PTL) 1.

CITATION LIST

Patent Literature

PTL 1: JP 2016-106321 A

SUMMARY

In the above technology, an observer of a screen is not notified which of multiple images to look at.

It would be helpful to easily indicate which of multiple images an observer should look at.

An information processing apparatus according to an embodiment of the present disclosure is an information processing apparatus capable of communicating with a plurality of vehicles configured to perform automated driving, the information processing apparatus including a controller configured to execute operations, the operations including:

receiving, from each of the plurality of vehicles, a notification of a content of an abnormality, an in-vehicle image, and the number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

An information processing method according to an embodiment of the present disclosure is an information processing method by an information processing apparatus capable of communicating with a plurality of vehicles configured to perform automated driving, the information processing method including:

receiving, from each of the plurality of vehicles, a notification of a content of an abnormality, an in-vehicle image, and the number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

A program according to an embodiment of the present disclosure is configured to cause a computer, as an information processing apparatus capable of communicating with a plurality of vehicles configured to perform automated driving, to execute operations, the operations including:

receiving, from each of the plurality of vehicles, a notification of a content of an abnormality, an in-vehicle image, and the number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

An embodiment of the present disclosure can easily indicate which of multiple images an observer should look at.

DETAILED DESCRIPTION

Figure 1:
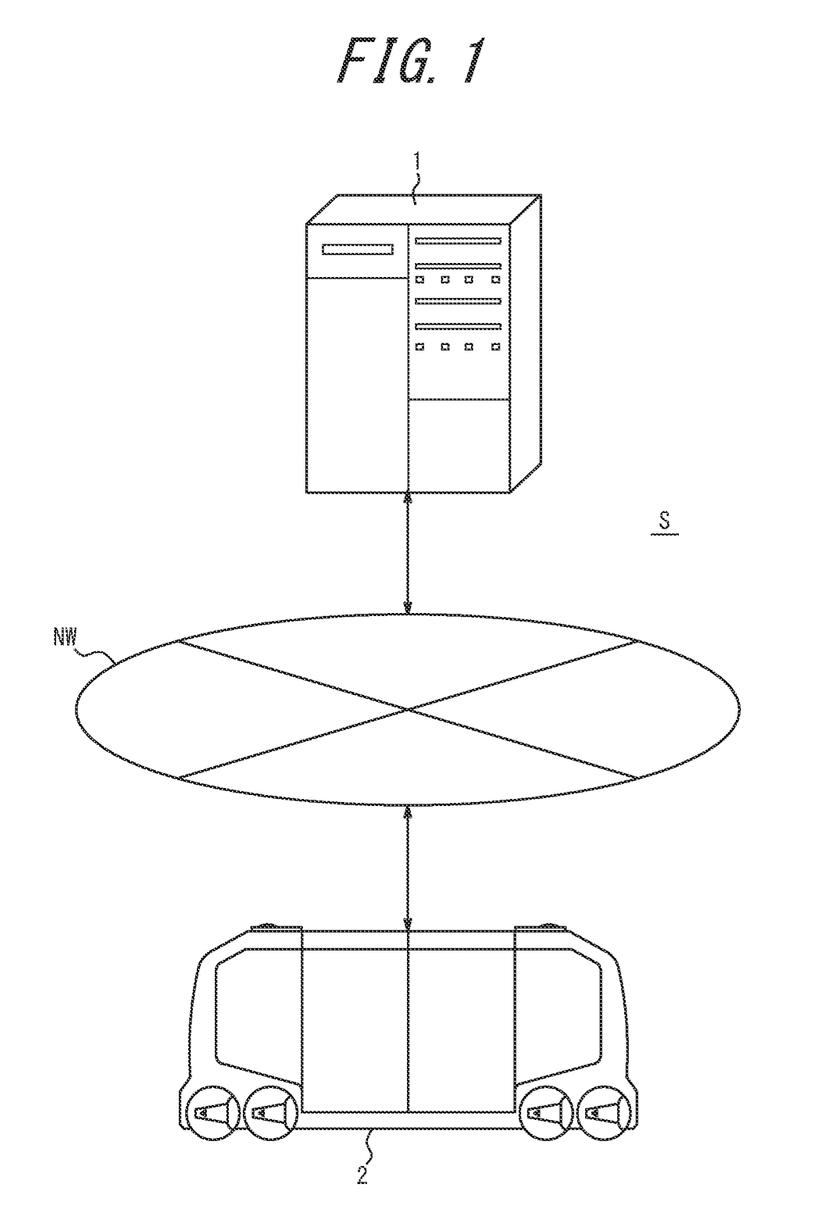
FIG. 1 is a schematic diagram of an information processing system according to the present embodiment.

FIG. 1 is a schematic diagram of an information processing system S according to the present embodiment. The information processing system S includes an information processing apparatus 1 and a vehicle 2. The information processing apparatus 1 can communicate with the vehicle 2 via a network NW. The network NW includes, for example, a mobile communication network, the Internet, or a fixed communication network.

FIG. 1 illustrates one of the information processing apparatus 1 and one of the vehicle 2, for convenience of explanation. However, the number of information processing apparatuses 1 and the number of vehicles 2 are not limited to this. For example, processing to be executed by the information processing apparatus 1 may be executed by a plurality of distributed information processing apparatuses 1. The information processing apparatus 1 may be capable of communicating with a plurality of vehicles 2.

An outline of processing executed by the information processing apparatus 1 of the present embodiment will be described. Operations of a controller 11 of the information processing apparatus 1 include receiving, from each of a plurality of vehicles, a notification of a content of an abnormality, an in-vehicle image, and the number of persons in the vehicle, determining, for each of the plurality of vehicles, a load of an automated driving process and the number of persons in the vehicle and prioritizing the plurality of vehicles based on determination results, and displaying with emphasis the content of the abnormality of a vehicle of a highest priority and the in-vehicle image of the vehicle of the highest priority. With this configuration, the information processing apparatus 1 can easily indicate which of multiple images an observer at a control center or the like should look at, even when abnormalities occur simultaneously in a plurality of vehicles in a situation in which the observer has to monitor a plurality of vehicles at the same time. The information processing apparatus 1 can thus automatically clarify a target vehicle that should be prioritized, thereby assisting the observer in smoothly making a decision and in smoothly handling an abnormality notification.

The information processing apparatus 1 may be a server configured to assist a provider in providing a service. The information processing apparatus 1 may be, for example, installed in a facility dedicated to the provider or in a shared facility including a data center. As an alternative example, the information processing apparatus 1 may be mounted in the vehicle 2. The information processing apparatus 1 may be referred to as a center server.

The vehicle 2 includes, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The driving of the vehicle 2 may be automated at any level. The automation level is, for example, any one of Level 1 to Level 5 according to the level classification defined by SAE. The name "SAE" is an abbreviation of Society of Automotive Engineers. The vehicle 2 may be a MaaS-dedicated vehicle. The term "MaaS" is an abbreviation of Mobility as a Service. Alternatively, the vehicle 2 may be driven by a driver.

Figure 2:
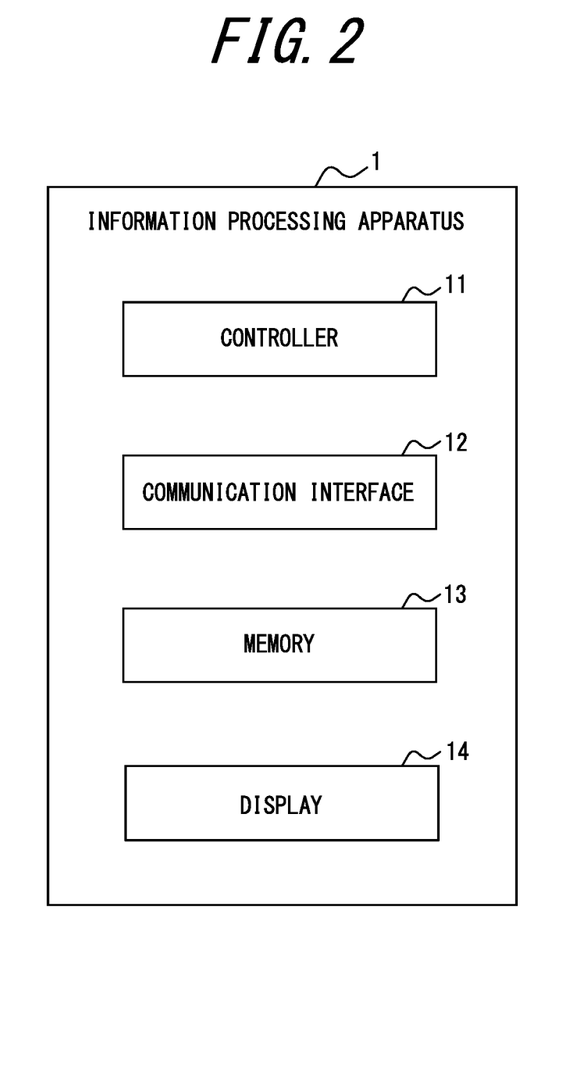
FIG. 2 is a block diagram illustrating a configuration of an information processing apparatus.

In FIG. 2, an internal configuration of the information processing apparatus 1 will be described in detail.

The information processing apparatus 1 includes a controller 11, a communication interface 12, a memory 13, and a display 14. The components of the information processing apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes, for connecting to a network, one or more communication modules that conform to wired or wireless LAN (Local Area Network) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network.

The memory 13 includes, for example, a semiconductor memory, a magnetic memory, an optical memory, or a combination of at least two of these, 20) but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The 25 memory 13 may store various types of information or the like regarding operations and control of the information processing apparatus 1. The memory 13 may store a system program, an application program, embedded software, and the like. The memory 13 may be provided outside the information processing apparatus 1 and accessed by the information processing apparatus 1. The memory 13 includes a vehicle information DB.

The display 14 is, for example, a display. The display is, for example, an LCD or an organic EL display. The term "LCD" is an abbreviation of liquid crystal display. The term "EL" is an abbreviation of electro luminescence. The display 14 may be connected to the information processing apparatus 1 as an 35 external output device, instead of being included in the information processing apparatus 1. As a connection method, any technology such as USB, HDMI® (HDMI is a registered trademark in Japan, other countries, or both), or Bluetooth® can be used. The term "USB" is an abbreviation of Universal Serial Bus. The term "HDMI®" is an abbreviation of High-Definition Multimedia Interface.

Figure 3:
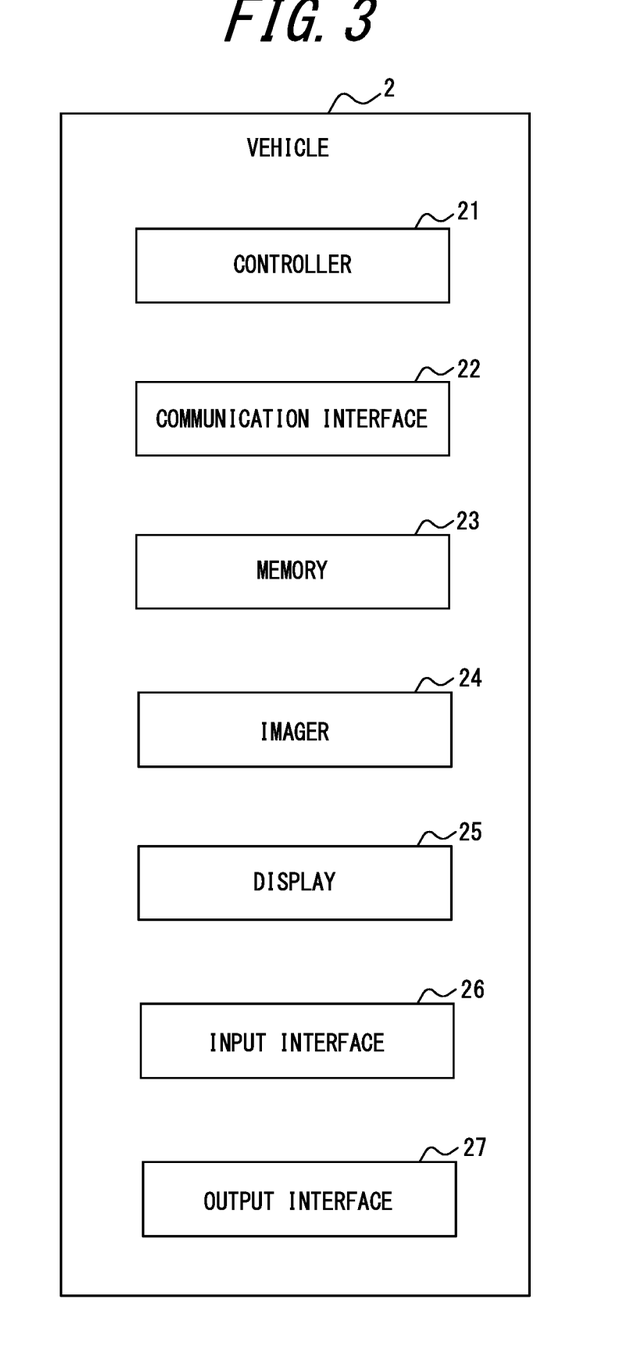
FIG. 3 is a block diagram illustrating a configuration of a vehicle.

In FIG. 3, an internal configuration of the vehicle 2 will be described in detail.

The vehicle 2 includes a controller 21, a communication interface 22, a memory 23, an imager 24, a display 25, an input interface 26, and an output interface 27. The components of the vehicle 2 are communicably connected to one another, for example, via dedicated lines.

Descriptions of the hardware configurations of the controller 21, the communication interface 22, the memory 23, and the display 25 may be the same as the descriptions of the hardware configurations of the controller 11, the communication interface 12, the memory 13, and the display 14, respectively. An explanation here is omitted.

The vehicle 2 according to the present embodiment performs automated driving. The memory 23 of the vehicle 2 stores Autonomous Driving Kit (ADK) software for the automated driving and conductor software. The imager 24 includes a camera and captures images. The images may be either still images or moving images. The imager 24 may generate the images and record the generated images in the memory 23. The imager 24 may include a camera to assist in remote operations of the vehicle 2 and a surveillance camera for a conductor.

The display 25 may be a signage. The display 25 may be a touch panel.

The input interface 26 is, for example, a microphone, a physical key, a capacitive key, a pointing device, or a touch screen integrally provided with a display. The input interface 26 accepts an operation for inputting information to be used for the operations of the vehicle 2. The input interface 26 may be connected to the vehicle 2 as an external input device, instead of being provided in the vehicle 2. As a connection method, any technology such as USB, HDMI®, or Bluetooth® can be used.

The output interface 27 includes at least one output interface for outputting information to notify a user of the information. For example, the output interface included in the output interface 27 is a speaker for outputting the information in the form of audio, or the like, but is not limited to this. For example, the output interface 27 may be any broadcast device.

The vehicle 2 may further include a sensor. The vehicle 2 may further include a calling device for calls between passengers and an operator of the information processing apparatus 1. The vehicle 2 may further include various buttons for bus operations.

Figure 4:
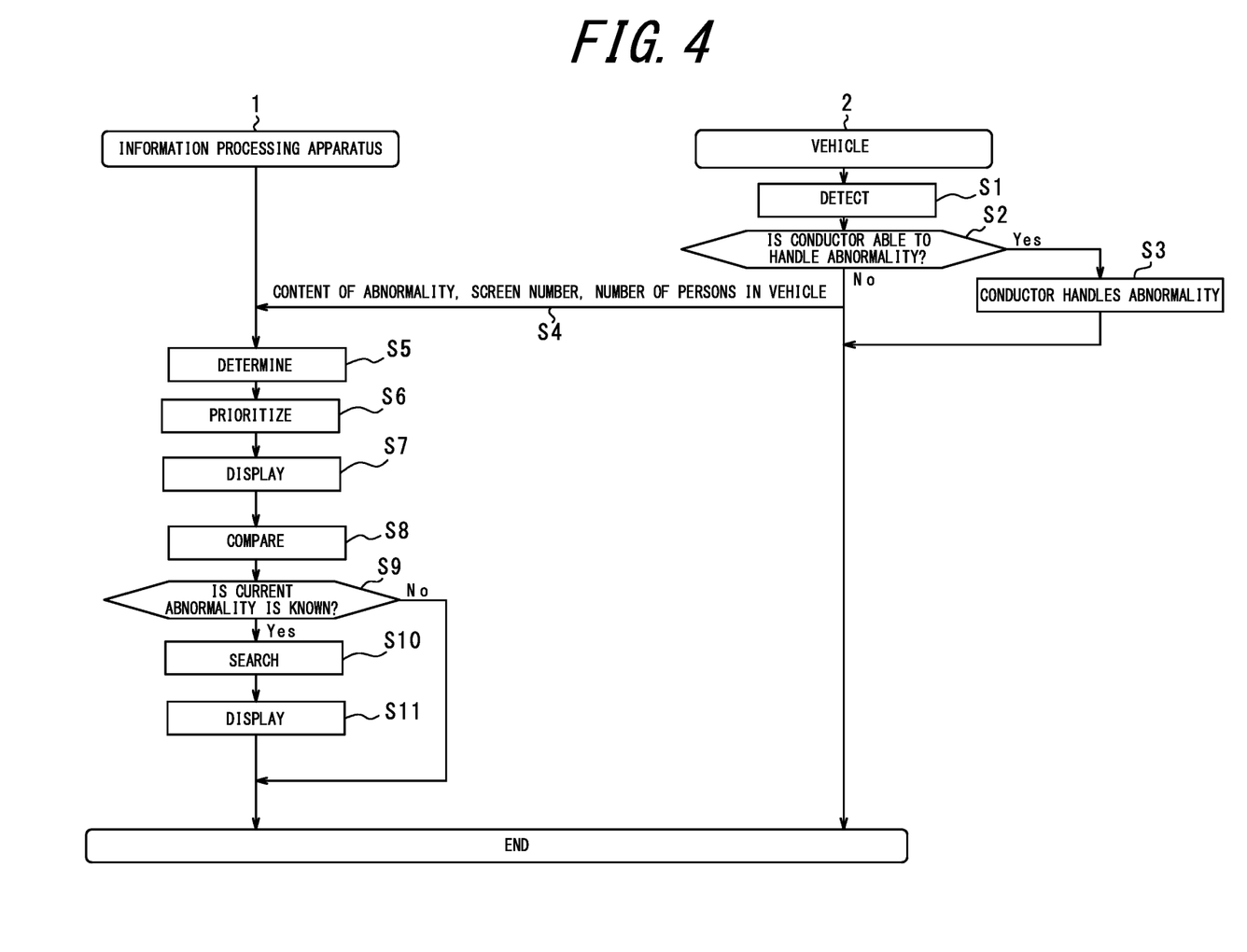
FIG. 4 is a sequence diagram illustrating operations of the information processing system.

Hereinafter, as illustrated in FIG. 4, processing executed by the information processing system S according to the present embodiment will be described in detail. As an example here, a plurality of vehicles 2 is operated as automated driving buses. The information processing apparatus 1 at a control center monitors the plurality of vehicles 2. As an example here, nine vehicles in total, including vehicles 2A to 2I, are monitored on a monitoring screen in the display 14. As illustrated in A in FIG. 6 described below, the remote monitoring screen is divided into nine screens. In-vehicle images of the vehicles 2A to 2I are displayed on screens 2a to 2i, respectively.

The nine vehicles are collectively referred to as vehicles 2. The number of vehicles to be monitored can be set appropriately.

In step S1, the controller 21 of each vehicle 2 detects and analyzes conditions inside the vehicle 2 using the imager 24 or sensor. The controller 21 detects an abnormality by image analysis or the like. The content of the abnormality includes at least one of the following:

Presence of a passenger near a door (e.g., The passenger leaning against the door hinders opening of the door.)
Dangerous act while driving
Dispute between passengers In step S2, the controller 21 determines whether a conductor of the vehicle 2 is able to handle the abnormality. Whether the conductor is able to handle the abnormality may be based on the conductor's decision.

When Yes is selected in step S2, the conductor handles the abnormality in step S3.

When No is selected in step S2, then in step S4, the controller 21 notifies the information processing apparatus 1 of the content of the abnormality, in-vehicle images, a screen number of a screen displaying an in-vehicle image that needs to be checked on the remote monitoring screen in the display 14, and the number of persons in the vehicle. The notification is also referred to as escalation. As an additional example, at least one of the following requests may be notified:

Request to alert a passenger near a door
Request for arbitration between passengers As an alternative example, the controller 21 may transmit the in-vehicle images to the information processing apparatus 1 on a regular or irregular basis, regardless of whether an abnormality is detected.

Figure 5:
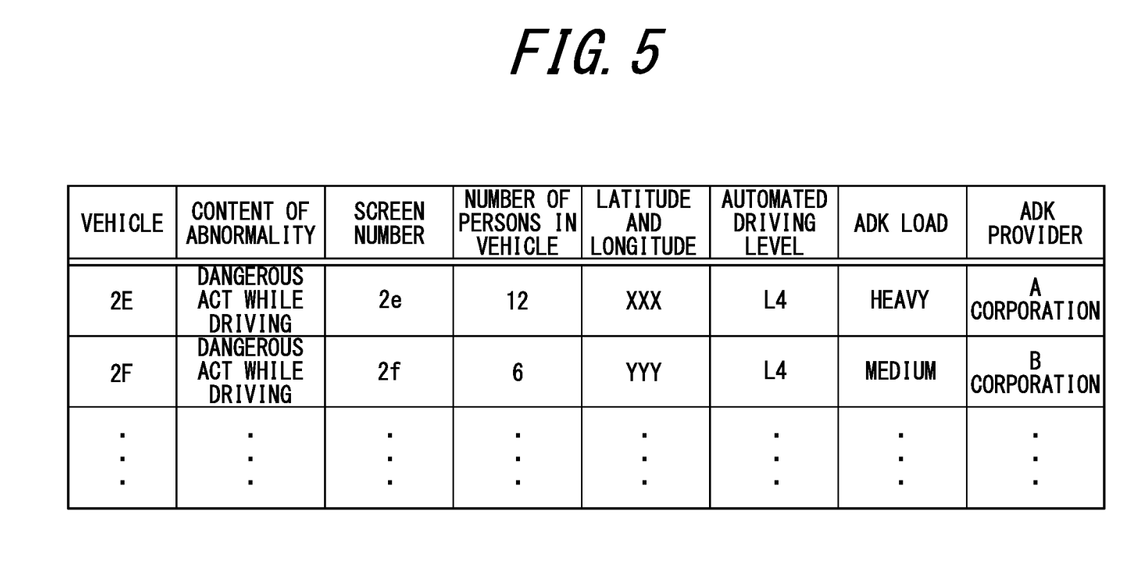
FIG. 5 is a diagram illustrating a data structure of a vehicle information database (DB)

As an example, a situation in which all the nine vehicles notify the information processing apparatus 1 of abnormalities is described here. The number of vehicles that notify abnormalities is arbitrary. As illustrated in FIG. 5, the controller 11 stores, in association with each vehicle, the content of an abnormality, a screen number of a screen that needs to be checked, and the number of persons in the vehicle, which is the number of persons present in the vehicle. As an additional example, the controller 11 may store, in association with each vehicle, the latitude and longitude of each vehicle, an automated driving level, a load of an automated driving process (corresponding to "ADK load" in FIG. 6), and an ADK provider. Information indicating the load of the automated driving process may be received from each vehicle, the information processing apparatus 1, or the like.

In step S5 of FIG. 4, the controller 11 determines, for each vehicle, the load of the automated driving process and the number of persons in the vehicle.

In step S6, the controller 11 prioritizes the vehicles based on determination results. For example, the controller 11 may assign a higher priority to a vehicle with a greater load of the automated driving process. As an additional or alternative example, the controller 11 may assign a higher priority to a vehicle with more persons in the vehicle. As an example, a situation in which the highest priority is assigned to the vehicle 2E is described here. As an additional example, the controller 11 may assign a higher priority to a vehicle with a more number of emergency stop record. The emergency stop record may be, for example, the average number of emergency stops in 10 kilometers of operation.

Figure 6:
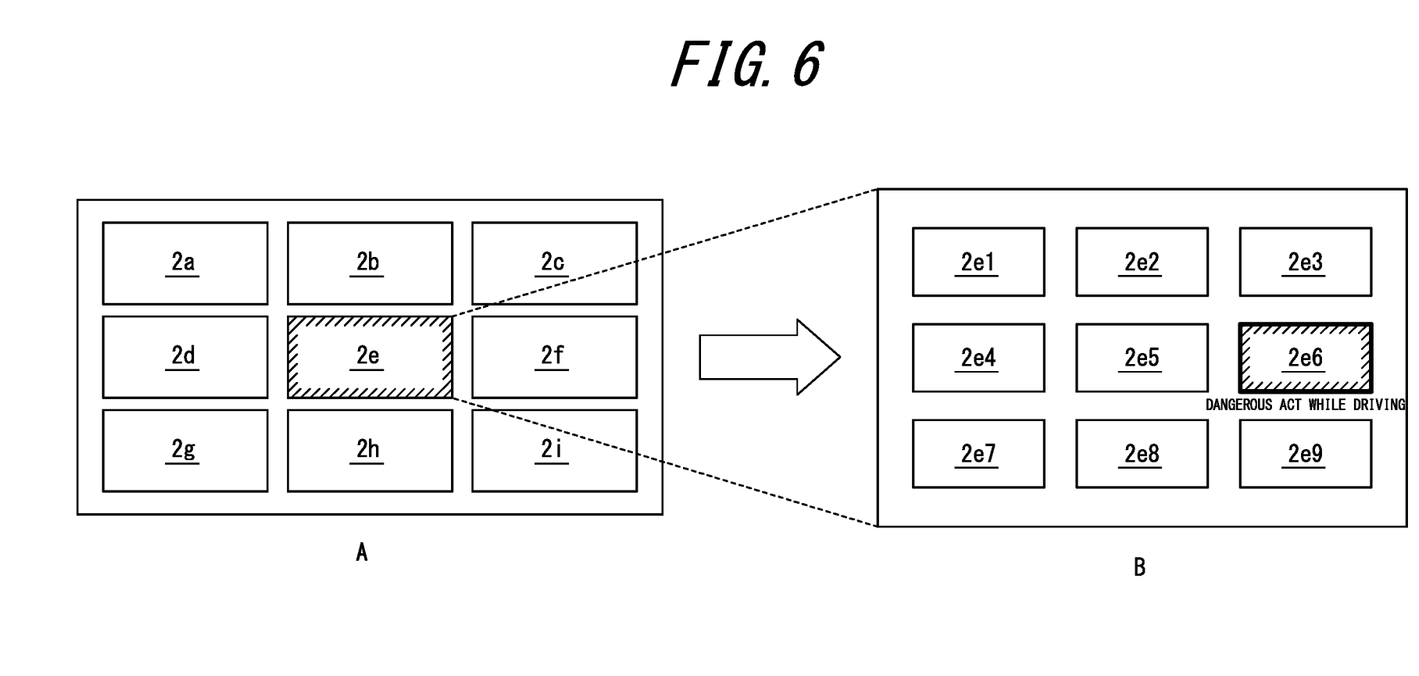
FIG. 6 is a diagram illustrating a display screen.

In step S7, as illustrated in B in FIG. 6, the controller 11 displays the in-vehicle images of the vehicle 2E to which the highest priority is assigned, on nine divided screens (i.e., screens 2e1, 2e2, 2e3, 2e4, 2e5, 2e6, 2e7, 2e8, and 2e9) in the display 14. The nine screens display the respective in-vehicle images that are captured from a plurality of different locations inside the vehicle 2E. Furthermore, the controller 11 checks the screen number notified by the vehicle 2E. As an example here, the notified screen number is 2e6. The controller 11 displays with emphasis the content of the abnormality and an in-vehicle image in the screen number 2e6. For example, the controller 11 may thicken text indicating the content of the abnormality and a frame of a screen displaying the in-vehicle image, or change the color of the text and the frame to red or the like. As an additional or alternative example, the controller 11 may enlarge or blink the screen corresponding to screen number 2e6.

In step S8, the controller 11 may compare the content of the notified current abnormality with past cases. Step S8 is optional.

In step S9, the controller 11 determines whether the notified current abnormality is "new" or "known" (existing). Step S9 is optional. For example, the controller 11 determines that the notified current abnormality is "known" when, in the comparison between the notified current abnormality and the past cases, all three items, i.e., the content of the abnormality, the screen number, and a time period are the same. When any one of the three items is different, the controller 11 may determine that the notified current abnormality is "new".

When Yes is selected in step S9, the controller 11 searches, in step S10, a past archive in the memory 13 for details of a response performed at that time in a corresponding past case. In step S11, the controller 11 may display the content of the current abnormality and the details of the response performed at that time on the remote monitoring screen of the display 14.

When No is selected in step S9, the controller 11 does not perform steps S10 and S11.

As described above, according to the present embodiment, the operations of the controller 11 include receiving, from each of a plurality of vehicles, a notification of the content of an abnormality, in-vehicle images, and the number of persons in the vehicle, determining, for each of the plurality of vehicles, a load of an automated driving process and the number of persons in the vehicle and prioritizing the plurality of vehicles based on determination results, and displaying with emphasis the content of the abnormality of a vehicle of the highest priority and the in-vehicle images of the vehicle of the highest priority. With this configuration, the information processing apparatus 1 can easily indicate which of multiple images an observer at a control center or the like should look at, even when abnormalities occur simultaneously in a plurality of vehicles in a situation in which the observer has to monitor a plurality of vehicles at the same time. Thus, the information processing apparatus 1 can automatically clarify a target vehicle that should be prioritized, thereby assisting the observer in smoothly making a decision and in smoothly handling an abnormality notification.

According to the present embodiment, the operations of the controller 11 also include receiving, from the vehicle of the highest priority, a plurality of in-vehicle images captured from a plurality of different positions in the vehicle, receiving a screen number of a screen displaying, among the plurality of in-vehicle images, an in-vehicle image that needs to be checked on a remote monitoring screen, and displaying with emphasis the in-vehicle image corresponding to the screen number. With this configuration, the information processing apparatus 1 can easily indicate where an abnormality is present in the vehicle, thus further assisting the observer in smoothly making a decision and in smoothly handling an abnormality notification.

According to the present embodiment, the operations also include prioritizing the plurality of vehicles based on an emergency stop record of each of the plurality of vehicles, in addition to the determination results. With this configuration, the information processing apparatus 1 can assign a higher priority to a vehicle that is more likely to make an emergency stop, thus reducing the likelihood of the emergency stop and reducing an impact on passengers standing inside the vehicle.

According to the present embodiment, the operations also include comparing a notified current abnormality with past cases, determining, from a comparison result, whether the abnormality is new or known, and upon determining that the current abnormality is known, displaying details of a response performed in a corresponding past case. With this configuration, the information processing apparatus 1 can assist the observer in smoothly handling an abnormality notification with reference to the past case.

According to the present embodiment, the content of the abnormality includes the presence of a passenger near a door, a dangerous act while driving, and/or a dispute between passengers. With this configuration, the information processing apparatus 1 can assist in smooth processing of various abnormalities.

According to the present embodiment, the operations also include assigning a higher priority to a vehicle with a greater load of an automated driving process or to a vehicle with a greater number of persons in the vehicle. Especially when vehicles drive on city roads, a load of an automated driving process increases due to many obstacles, and many abnormalities occur. In addition, when abnormalities occur, vehicles with more passengers take longer to board or disembark the passengers. Therefore, the above configuration of prioritization allows the information processing apparatus 1 to reduce the impact of abnormalities on operations.

According to the present embodiment, displaying with emphasis the in-vehicle image includes thickening a frame of a screen displaying the in-vehicle image and enlarging the screen. With this configuration, the information processing apparatus 1 can more easily indicate which image the observer should look at.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each component or each step can be rearranged without logical inconsistency, and a plurality of components or steps can be combined into one or divided.

For example, in the aforementioned embodiment, a program configured to execute all or some of the functions or processing of the information processing apparatus 1 can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may be provided as a program product. The present disclosure can also be implemented as a program executable by a processor.

A computer temporarily stores in a main memory, for example, the program recorded on the portable recording medium, or the program transferred from the server. Then, the computer reads the program stored in the main memory using a processor, and executes processes in accordance with the read program using the processor. The computer may read the program directly from the portable recording medium, and execute processes in accordance with the program. The computer may, each time a program is transferred from the server to the computer, sequentially execute processes in accordance with the received program. Instead of transferring the program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

Examples of some embodiments of the present disclosure are described below. However, it should be noted that the embodiments of the present disclosure are not limited to these examples.

[Appendix 1] An information processing apparatus capable of communicating with a plurality of vehicles configured to perform automated driving, the information processing apparatus comprising a controller configured to execute operations, the operations comprising:

receiving, from each of the plurality of vehicles, a notification of a content of an abnormality, an in-vehicle image, and a number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

[Appendix 2] The information processing apparatus according to appendix 1, wherein the operations comprise:

receiving, from the vehicle of the highest priority, a plurality of in-vehicle images captured from a plurality of different positions in the vehicle;

receiving a screen number of a screen displaying, among the plurality of in-vehicle images, an in-vehicle image that needs to be checked on a remote monitoring screen; and displaying with emphasis the in-vehicle image corresponding to the screen number.

[Appendix 3] The information processing apparatus according to appendix 1 or 2, wherein the operations comprise prioritizing the plurality of vehicles based on an emergency stop record for each of the plurality of vehicles, in addition to the determination result.

[Appendix 4] The information processing apparatus according to any one of appendices 1 to 3, wherein the operations comprise:

comparing a notified current abnormality with a past case;

determining, from a comparison result, whether the abnormality is new or known; and upon determining that the current abnormality is known, displaying details of a response performed in the corresponding past case.

[Appendix 5] The information processing apparatus according to any one of appendices 1 to 4, wherein the content of the abnormality includes a presence of a passenger near a door, a dangerous act while driving, and/or a dispute between passengers.

[Appendix 6] The information processing apparatus according to any one of appendices 1 to 5, wherein the operations comprise assigning a higher priority to a vehicle with a greater load of the automated driving process or to a vehicle with a greater number of persons in the vehicle.

[Appendix 7] The information processing apparatus according to any one of appendices 1 to 6, wherein the displaying with emphasis of the in-vehicle image comprises thickening a frame of a screen displaying the in-vehicle image and enlarging the screen.

[Appendix 8] An information processing method by an information processing apparatus capable of communicating with a plurality of vehicles configured to perform automated driving, the information processing method comprising:

receiving, from each of the plurality of vehicles, a notification of a content of an abnormality, an in-vehicle image, and a number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

[Appendix 9] The information processing method according to appendix 8, comprising:

receiving, from the vehicle of the highest priority, a plurality of in-vehicle images captured from a plurality of different positions in the vehicle;

receiving a screen number of a screen displaying, among the plurality of in-vehicle images, an in-vehicle image that needs to be checked on a remote monitoring screen; and displaying with emphasis the in-vehicle image corresponding to the screen number.

[Appendix 10] The information processing method according to appendix 8 or 9, comprising prioritizing the plurality of vehicles based on an emergency stop record for each of the plurality of vehicles, in addition to the determination result.

[Appendix 11] The information processing method according to any one of appendices 8 to 10, comprising:

comparing a notified current abnormality with a past case;

determining, from a comparison result, whether the abnormality is new or known; and upon determining that the current abnormality is known, displaying details of a response performed in the corresponding past case.

[Appendix 12] The information processing method according to any one of appendices 8 to 11, wherein the content of the abnormality includes a presence of a passenger near a door, a dangerous act while driving, and/or a dispute between passengers.

[Appendix 13] The information processing method according to any one of appendices 8 to 12, comprising assigning a higher priority to a vehicle with a greater load of the automated driving process or to a vehicle with a greater number of persons in the vehicle.

[Appendix 14] The information processing method according to any one of appendices 8 to 13, wherein the displaying with emphasis of the in-vehicle image comprises thickening a frame of a screen displaying the in-vehicle image and enlarging the screen.

[Appendix 15] A program configured to cause a computer, as an information processing apparatus capable of communicating with a plurality of vehicles configured to perform automated driving, to execute operations, the operations comprising:

receiving, from each of the plurality of vehicles, a notification of a content of an abnormality, an in-vehicle image, and a number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

[Appendix 16] The program according to appendix 15, wherein the operations comprise:

receiving, from the vehicle of the highest priority, a plurality of in-vehicle images captured from a plurality of different positions in the vehicle;

receiving a screen number of a screen displaying, among the plurality of in-vehicle images, an in-vehicle image that needs to be checked on a remote monitoring screen; and displaying with emphasis the in-vehicle image corresponding to the screen number.

[Appendix 17] The program according to appendix 15 or 16, wherein the operations comprise prioritizing the plurality of vehicles based on an emergency stop record for each of the plurality of vehicles, in addition to the determination result.

[Appendix 18] The program according to any one of appendices 15 to 17, wherein the operations comprise:

comparing a notified current abnormality with a past case;

determining, from a comparison result, whether the abnormality is new or known; and upon determining that the current abnormality is known, displaying details of a response performed in the corresponding past case.

[Appendix 19] The program according to any one of appendices 15 to 18, wherein the content of the abnormality includes a presence of a passenger near a door, a dangerous act while driving, and/or a dispute between passengers.

[Appendix 20] The program according to any one of appendices 15 to 19, wherein the operations comprise assigning a higher priority to a vehicle with a greater load of the automated driving process or to a vehicle with a greater number of persons in the vehicle.

The invention claimed is:

1. An information processing apparatus capable of communicating with a plurality of vehicles configured to perform automated driving, the information processing apparatus comprising a controller configured to execute operations, the operations comprising:

receiving, from each of the plurality of vehicles, a notification of a content of an abnormality, an in-vehicle image, and a number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

2. The information processing apparatus according to claim 1, wherein the operations comprise:

receiving, from the vehicle of the highest priority, a plurality of in-vehicle images captured from a plurality of different positions in the vehicle;

receiving a screen number of a screen displaying, among the plurality of in-vehicle images, an in-vehicle image that needs to be checked on a remote monitoring screen; and displaying with emphasis the in-vehicle image corresponding to the screen number.

3. The information processing apparatus according to claim 1, wherein the operations comprise prioritizing the plurality of vehicles based on an emergency stop record for each of the plurality of vehicles, in addition to the determination result.

4. The information processing apparatus according to claim 1, wherein the operations comprise:

comparing a notified current abnormality with a past case;

determining, from a comparison result, whether the abnormality is new or known; and upon determining that the current abnormality is known, displaying details of a response performed in the corresponding past case.

5. The information processing apparatus according to claim 1, wherein the content of the abnormality includes a presence of a passenger near a door, a dangerous act while driving, and/or a dispute between passengers.

6. The information processing apparatus according to claim 1, wherein the operations comprise assigning a higher priority to a vehicle with a greater load of the automated driving process or to a vehicle with a greater number of persons in the vehicle.

7. The information processing apparatus according to claim 1, wherein the displaying with emphasis of the in-vehicle image comprises thickening a frame of a screen displaying the in-vehicle image and enlarging the screen.

8. An information processing method by an information processing apparatus capable of communicating with a plurality of vehicles configured to perform automated driving, the information processing method comprising:

receiving, from each of the plurality of vehicles, a notification of a content of an abnormality, an in-vehicle image, and a number of persons in the vehicle;

prioritizing the plurality of vehicles based on a determination result by determining, for each of the plurality of vehicles, a load of an automated driving process and the number of persons in the vehicle; and displaying with emphasis the content of the abnormality of a vehicle of a highest priority and the in-vehicle image of the vehicle of the highest priority.

9. The information processing method according to claim 8, comprising:

receiving, from the vehicle of the highest priority, a plurality of in-vehicle images captured from a plurality of different positions in the vehicle;

receiving a screen number of a screen displaying, among the plurality of in-vehicle images, an in-vehicle image that needs to be checked on a remote monitoring screen; and displaying with emphasis the in-vehicle image corresponding to the screen number.

10. The information processing method according to claim 8, comprising prioritizing the plurality of vehicles based on an emergency stop record for each of the plurality of vehicles, in addition to the determination result.

11. The information processing method according to claim 8, comprising:

comparing a notified current abnormality with a past case;

determining, from a comparison result, whether the abnormality is new or known; and upon determining that the current abnormality is known, displaying details of a response performed in the corresponding past case.

12. The information processing method according to claim 8, wherein the content of the abnormality includes a presence of a passenger near a door, a dangerous act while driving, and/or a dispute between passengers.

13. The information processing method according to claim 8, comprising assigning a higher priority to a vehicle with a greater load of the automated driving process or to a vehicle with a greater number of persons in the vehicle.

14. The information processing method according to claim 8, wherein the displaying with emphasis of the in-vehicle image comprises thickening a frame of a screen displaying the in-vehicle image and enlarging the screen.

15. A non-transitory computer readable medium storing a program configured to cause a computer, as an information processing apparatus capable of communicating with a plurality of vehicles configured to perform automated driving, to execute operations, the operations comprising:
  receiving, from each of the plurality of vehicles, a notification of a content of an abnormality, an in-vehicle image, and a number of persons in the vehicle;
  prioritizing the plurality of vehicles based on a determination result by determining, for each of the plurality of vehicles, a load of an automated driving process and the number of persons in the vehicle; and
  displaying with emphasis the content of the abnormality of a vehicle of a highest priority and the in-vehicle image of the vehicle of the highest priority.

16. The non-transitory computer readable medium according to claim 15, wherein the operations comprise:
  receiving, from the vehicle of the highest priority, a plurality of in-vehicle images captured from a plurality of different positions in the vehicle;
  receiving a screen number of a screen displaying, among the plurality of in-vehicle images, an in-vehicle image that needs to be checked on a remote monitoring screen; and
  displaying with emphasis the in-vehicle image corresponding to the screen number.

17. The non-transitory computer readable medium according to claim 15, wherein the operations comprise prioritizing the plurality of vehicles based on an emergency stop record for each of the plurality of vehicles, in addition to the determination result.

18. The non-transitory computer readable medium according to claim 15, wherein the operations comprise:
  comparing a notified current abnormality with a past case;
  determining, from a comparison result, whether the abnormality is new or known; and
  upon determining that the current abnormality is known, displaying details of a response performed in the corresponding past case.

19. The non-transitory computer readable medium according to claim 15, wherein the content of the abnormality includes a presence of a passenger near a door, a dangerous act while driving, and/or a dispute between passengers.

20. The non-transitory computer readable medium according to claim 15, wherein the operations comprise assigning a higher priority to a vehicle with a greater load of the automated driving process or to a vehicle with a greater number of persons in the vehicle.

* * * * *